US012085242B1

(12) United States Patent
Zheng et al.

(10) Patent No.: US 12,085,242 B1
(45) Date of Patent: Sep. 10, 2024

(54) STARRY SKY LAMP

(71) Applicant: Shenzhen Bolong Technology Co. Ltd., Shenzhen (CN)

(72) Inventors: Huazhu Zheng, Shenzhen (CN); Caijian Zheng, Shenzhen (CN); Wenzhen Ouyang, Shenzhen (CN); Yunyun Lu, Shenzhen (CN)

(*) Notice: Subject to any disclaimer, the term of this patent is extended or adjusted under 35 U.S.C. 154(b) by 0 days.

(21) Appl. No.: 18/422,232

(22) Filed: Jan. 25, 2024

(30) Foreign Application Priority Data

Jan. 9, 2024 (CN) ........................ 202420062028.7

(51) Int. Cl.
*F21S 10/00* (2006.01)
*F21V 5/04* (2006.01)

(52) U.S. Cl.
CPC ............. *F21S 10/007* (2013.01); *F21V 5/04* (2013.01)

(58) Field of Classification Search
CPC ...... F21S 10/007; F21V 5/04; Y10S 362/807; Y10S 302/811
USPC ................................ 362/323, 807, 809, 811
See application file for complete search history.

(56) References Cited

U.S. PATENT DOCUMENTS 9,194,551 B1 * 11/2015 Zhang .................. G03B 21/145
10,120,270 B1 * 11/2018 Zhang ................ G02B 27/0955
11,281,083 B1 3/2022 Xin
11,572,991 B2 2/2023 Li et al.
11,662,071 B1 5/2023 Wang
11,692,681 B1 7/2023 Zheng et al.
11,698,187 B1 * 7/2023 Zheng .................... G03B 31/00 362/86
11,739,926 B1 8/2023 Li
2021/0164628 A1 * 6/2021 Zheng ....................... F21V 5/02
2021/0247039 A1 * 8/2021 Zheng ....................... F21V 5/04
2021/0381666 A1 * 12/2021 Zheng ..................... F21V 5/005
2022/0099261 A1 * 3/2022 Wei ......................... F21V 21/30
2023/0003352 A1 1/2023 Li et al.
2023/0079299 A1 * 3/2023 Peng ......................... F21V 5/04 362/221

* cited by examiner

*Primary Examiner* — Laura K Tso

(57) ABSTRACT

A starry sky lamp, including: a first housing provided with a light-emitting opening; a light-emitting assembly arranged in the first housing and emitting light towards the light-emitting opening, including at least one incoherent light source and a condenser lens arranged in an irradiation surface of the incoherent light source; an imaging assembly arranged in the first housing and between the condenser lens and the light-emitting opening, comprising a first piece and a second piece sequentially arranged along an irradiation direction of the light-emitting assembly; a lens group arranged in the first housing and between the second piece and the light-emitting opening, comprising a plurality of imaging lenses sequentially arranged along the irradiation direction of the light-emitting assembly; a driving assembly arranged in the first housing and in driving connection with the second piece; and a second housing detachably connected to the first housing.

8 Claims, 8 Drawing Sheets

STARRY SKY LAMP

TECHNICAL FIELD

The present utility model relates to the technical field of projecting, and in particular, to a starry sky lamp.

BACKGROUND

With the continuous advancement of the times, the quality of life of people is continuously improved, and people have an increasing demand for environmental lighting and visual experience. In this context, a projection lamp, which is an electrical appliance capable of projecting images or characters on the ground or a wall, is becoming an indispensable part of people's lives. The projection lamp is not only widely applied to places such as stages, bedrooms and automobile lamps, but also plays an important role in the fields of commercial presentation, education and training and the like.

However, although the projection lamp has made certain progress in pattern presentation, the existing research and development efforts have focused on achieving diversification of patterns, resulting in a relatively single function of the projection lamp. Although the conventional projection lamp can provide a certain colorful effect in projecting patterns, the conventional projection lamp is still limited in lighting effect, and the pursuit of users for high-quality and diversified visual experiences is difficult to meet.

SUMMARY

A primary objective of the present utility model is to provide a starry sky lamp, aiming to improve the diversity of lighting effects projected by the starry sky lamp.

To achieve the objective, the present utility model provides a starry sky lamp, comprising: a first housing, wherein the first housing is provided with a light-emitting opening;

- a light-emitting assembly, wherein the light-emitting assembly is arranged in the first housing and emits light towards the light-emitting opening, and the light-emitting assembly comprises at least one incoherent light source and a condenser lens arranged in an irradiation surface of the incoherent light source;
- an imaging assembly, wherein the imaging assembly is arranged in the first housing and between the condenser lens and the light-emitting opening, and the imaging assembly comprises a first nebula piece and a second nebula piece sequentially arranged along an irradiation direction of the light-emitting assembly;
- a lens group, wherein the lens group is arranged in the first housing and between the second nebula piece and the light-emitting opening, and the lens group comprises a plurality of imaging lenses sequentially arranged along the irradiation direction of the light-emitting assembly;
- a driving assembly, wherein the driving assembly is arranged in the first housing, and the driving assembly is in driving connection with the second nebula piece to drive the second nebula piece to rotate; and
- a second housing, wherein the second housing is detachably connected to the first housing.

Optionally, the light-emitting assembly comprises a first mounting seat, the first mounting seat is fixed within the first housing, and the incoherent light source and the condenser lens are arranged on the first mounting seat.

Optionally, the first mounting seat is provided with a first fixing seat and a second fixing seat, the condenser lens is mounted on the first fixing seat, and the first nebula piece is mounted on the second fixing seat.

Optionally, the first fixing seat is arranged on the second fixing seat, a bottom of the second fixing seat is provided with a slot, the light-emitting assembly further comprises a circuit board, the incoherent light source is fixed on the circuit board, and the circuit board is inserted into the slot.

Optionally, the first fixing seat is provided with a first mounting groove and a first clamping buckle, and the condenser lens is arranged in the first mounting groove and is fixed through the first clamping buckle; and the second fixing seat is provided with a second mounting groove and a second clamping buckle, and the first nebula piece is arranged in the second mounting groove and is fixed through the second clamping buckle.

Optionally, the driving assembly comprises a driving motor, the driving motor is fixed on the first mounting seat, and the second nebula piece is fixed on a motor shaft of the driving motor.

Optionally, the lens group further comprises a fixing sleeve, and the plurality of imaging lenses are arranged at intervals within the fixing sleeve.

Optionally, the lens group further comprises a second mounting seat, the second mounting seat is arranged corresponding to the light-emitting opening, the second mounting seat is provided with a third fixing seat, and the fixing sleeve is mounted on the third fixing seat.

Optionally, the starry sky lamp further comprises a laser assembly arranged on the first housing, wherein the laser assembly comprises a coherent light source and a diffractive medium arranged on an irradiation surface of the coherent light source.

Optionally, the first housing has an arc-shaped connecting portion, and the second housing is provided with a movable groove adapted to the shape of the connecting portion; and the connecting portion is provided with a strip-shaped iron sheet, and a bottom of the movable groove is provided with a magnet cooperating with the strip-shaped iron sheet.

According to the technical solutions of the present utility model, the first housing is detachably arranged on the second housing, and the light-emitting assembly, the imaging assembly and the lens group are sequentially arranged in the first housing. The light-emitting assembly is arranged at the farthest end away from the light-emitting opening and emits light towards the light-emitting opening, and the imaging assembly is arranged between the lens group and the light-emitting assembly and is used to process the light emitted by the light-emitting assembly to form a lighting effect similar to a nebula. The imaging assembly comprises a first nebula piece and a second nebula piece, and the second nebula piece is driven to rotate by the driving assembly, such that a static nebula lighting effect is presented in a dynamic manner, and further, the diversity of lighting effects projected by the starry sky lamp is effectively improved.

BRIEF DESCRIPTION OF DRAWINGS

To more clearly illustrate the technical solutions in the embodiments of the present utility model or in the prior art, the drawings required to be used in the description of the embodiments or the prior art are briefly introduced below. It is obvious that the drawings in the description below are only some embodiments of the present utility model, and those of ordinary skill in the art can obtain other drawings according to structures illustrated in these drawings without creative efforts.

DESCRIPTIONS OF REFERENCE NUMERALS

Figure 1:
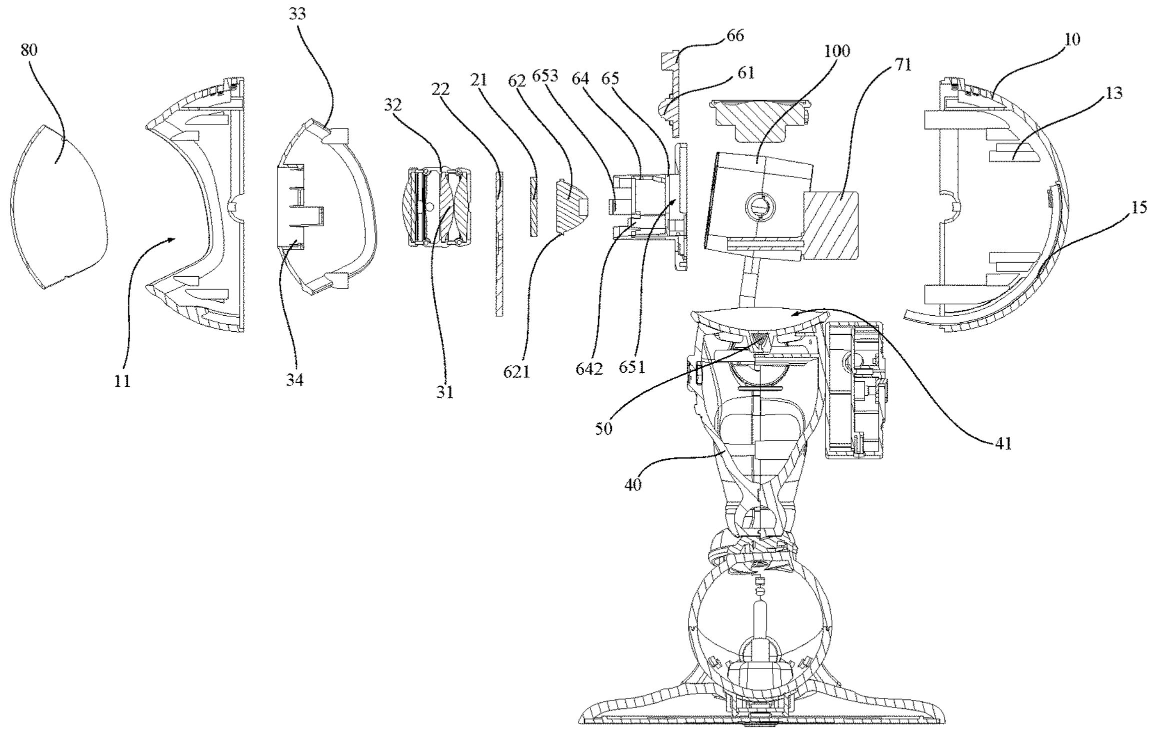
FIG. 1 is a schematic structural diagram of an embodiment of a starry sky lamp in an exploded state according to the present utility model.

| Reference numeral | Name | Reference numeral | Name |
|---|---|---|---|
| 10 | First housing | 61 | Incoherent light source |
| 11 | Light-emitting opening | 62 | Condenser lens |
| 13 | Fixing boss | 621 | Limiting ring |
| 15 | Strip-shaped iron sheet | 63 | First mounting seat |
| 21 | First nebula piece | 64 | First fixing seat |
| 22 | Second nebula piece | 641 | First mounting groove |
| 30 | Lens group | 642 | First clamping buckle |
| 31 | Imaging lens | 65 | Second fixing seat |
| 32 | Fixing sleeve | 651 | Slot |
| 33 | Second mounting seat | 652 | Second mounting groove |
| 34 | Third fixing seat | 653 | Second clamping buckle |
| 40 | Second housing | 66 | Circuit board |
| 41 | Movable groove | 71 | Driving motor |
| 50 | Magnet | 80 | Light-transmitting protective cover |
| 100 | Laser assembly | 90 | Clearance groove |
| 101 | Coherent light source | 102 | Diffractive medium |

The realization of the objectives, the functional features, and the advantages of the present utility model will be further explained in conjunction with the embodiments and with reference to the drawings.

DETAILED DESCRIPTION OF EMBODIMENTS

The technical solutions in the embodiments of the present utility model will be clearly and completely described below with reference to the drawings in the embodiments of the present utility model. It is apparent that the described embodiments are only some, but not all, embodiments of the present utility model. Based on the embodiments of the present utility model, all other embodiments obtained by those of ordinary skill in the art without creative efforts fall within the protection scope of the present utility model.

It should be noted that, if directional indications (such as upper, lower, left, right, front and rear) are involved in the embodiments of the present utility model, the directional indications are only used to explain the relative positional relationships, the motion situations and the like between individual components under a certain pose (as shown in the drawings), and if the certain pose is changed, the directional indications are changed accordingly.

In addition, if there are descriptions relating to "first", "second" and the like in the embodiments of the present utility model, the descriptions of "first", "second" and the like are for descriptive purposes only and are not to be construed as indicating or implying relative importance thereof or implicitly indicating the quantities of the indicated technical features. Thus, a feature defined by "first" or "second" may explicitly or implicitly include at least one such feature. In addition, "and/or" appearing herein is meant to include three parallel solutions, and taking "A and/or B" as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such a combination of the technical solutions should not be considered to exist, and is not within the protection scope of the present utility model.

The present utility model provides a starry sky lamp.

In an embodiment of the present utility model, as shown in FIGS. 1 to 5, the starry sky lamp comprises:

a first housing 10, wherein the first housing 10 is provided with a light-emitting opening 11;

a light-emitting assembly, wherein the light-emitting assembly is arranged in the first housing 10 and emits light towards the light-emitting opening 11, and the light-emitting assembly comprises at least one incoherent light source 61 and a condenser lens 62 arranged in an irradiation surface of the incoherent light source 61;

an imaging assembly, wherein the imaging assembly is arranged in the first housing 10 and between the condenser lens 62 and the light-emitting opening 11, and the imaging assembly comprises a first nebula piece 21 and a second nebula piece 22 sequentially arranged along an irradiation direction of the light-emitting assembly;

a lens group 30, wherein the lens group 30 is arranged in the first housing 10 and between the second nebula piece 22 and the light-emitting opening 11, and the lens group 30 comprises a plurality of imaging lenses 31 sequentially arranged along the irradiation direction of the light-emitting assembly;

a driving assembly, wherein the driving assembly is arranged in the first housing 10, and the driving assembly is in driving connection with the second nebula piece 22 to drive the second nebula piece 22 to rotate; and a second housing 40, wherein the second housing 40 is detachably connected to the first housing 10.

In this embodiment, the first housing 10 is used to provide a mounting position for other components of the starry sky lamp, and specifically, the first housing 10 has a mounting cavity, and the first housing 10 is provided with a light-emitting opening 11 communicated with the mounting cavity.

The light-emitting assembly is a light-emitting member used in one of the light-emitting modes of the starry sky lamp. The light-emitting assembly is arranged in the mounting cavity and emits light towards the light-emitting opening 11. The incoherent light source 61 is a light source member used in the light-emitting assembly and used for providing a light source. A plurality of the incoherent light source 61 may be provided to increase the light intensity, and the condenser lens 62 is used to condense the light emitted by the incoherent light source 61 to increase the light intensity, and is arranged in the irradiation surface of the incoherent light source 61.

The imaging assembly is used to process the light passing through the condenser lens 62 to form a lighting effect similar to a nebula on a light-shadow bearing surface. Specifically, the imaging assembly comprises a first nebula piece 21 and a second nebula piece 22 sequentially arranged along the irradiation direction of the light-emitting assembly. It can be understood that the first nebula piece 21 and the second nebula piece 22 are stacked on a light-emitting surface of the condenser lens 62, and meanwhile, concave-convex textures with different shapes are arranged on at least one surface of the first nebula piece 21 and the second nebula piece 22, such that when the light passing through the condenser lens 62 passes through the first nebula picce 21 and the second nebula piece 22, the light can be refracted for several times and then irradiated on the light-shadow bearing surface, and the light and shadow effect finally presented on the light-shadow bearing surface is similar to a nebula due to the arrangement of the concave-convex textures. The concave-convex texture can be an irregular strip-shaped concave-convex texture, can also be an irregular water ripple-shaped concave-convex texture, and can still be a combination of the strip-shaped concave-convex texture and the water ripple-shaped concave-convex texture, which is not specifically limited herein.

The lens group 30 is arranged in the mounting cavity and is used for further imaging processing of the light passing through the imaging assembly. Specifically, the lens group 30 may comprise a plurality of imaging lenses 31, wherein the plurality of imaging lenses 31 comprise an imaging lens 31 for forming a real image, an imaging lens 31 for reshaping and correcting the real image, and an imaging lens 31 for magnifying the adjusted real image. The plurality of imaging lenses 31 with different functions are sequentially arranged in the irradiation direction of the light-emitting assembly so as to form a clear and stable lighting effect. It should be explained that the functions of the different imaging lenses 31 are listed here, and the specific parameters of the imaging lenses 31 are different depending on the different functions, and meanwhile, the imaging lenses 31 with different functions may also be used in a plurality of combinations according to the actual use scenarios of the starry sky lamp, which is not specifically limited herein.

The driving assembly is a driving member used in the starry sky lamp and used for driving the second nebula piece 22 to rotate, which further enables the light and shadow projected by the starry sky lamp to be presented in a dynamic effect, and therefore the diversity of lighting effects of the starry sky lamp is effectively improved.

The second housing 40 is a support member used in the starry sky lamp and used for providing a mounting position for the first housing 10, wherein the second housing 40 is detachably connected to the first housing 10, such that the user can adjust the irradiation angle of the first housing 10 according to actual requirements so as to adapt to different use places, and the practicability of the starry sky lamp is effectively improved.

In addition, the incoherent light source 61, the condenser lens 62, the first nebula piece 21, and the lens group 30 are all coaxially arranged, such that the loss of the light emitted by the incoherent light source 61 can be effectively reduced, and the brightness of the pattern projected by the starry sky lamp is further improved.

According to the technical solutions of the present utility model, the first housing 10 is detachably arranged on the second housing 40, and the light-emitting assembly, the imaging assembly and the lens group 30 are sequentially arranged in the first housing 10. The light-emitting assembly is arranged at the farthest end away from the light-emitting opening 11 and emits light towards the light-emitting opening 11, and the imaging assembly is arranged between the lens group 30 and the light-emitting assembly and is used to process the light emitted by the light-emitting assembly to form a lighting effect similar to a nebula. The imaging assembly comprises a first nebula piece 21 and a second nebula piece 22, and the second nebula piece 22 is driven to rotate by the driving assembly, such that a static nebula lighting effect is presented in a dynamic manner, and further, the diversity of lighting effects projected by the starry sky lamp is effectively improved.

Figure 2:
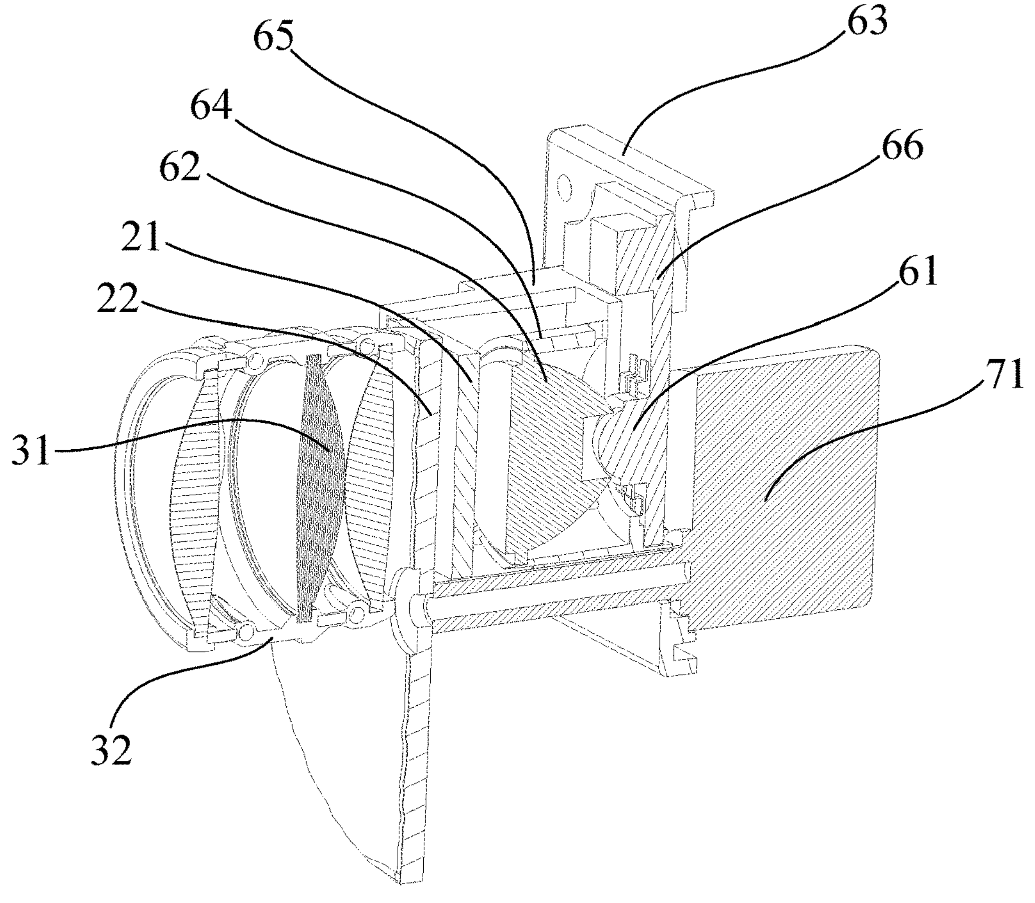
FIG. 2 is a cross-sectional view of a light-emitting assembly, an imaging assembly, a lens group, and a driving assembly.
Figure 3:
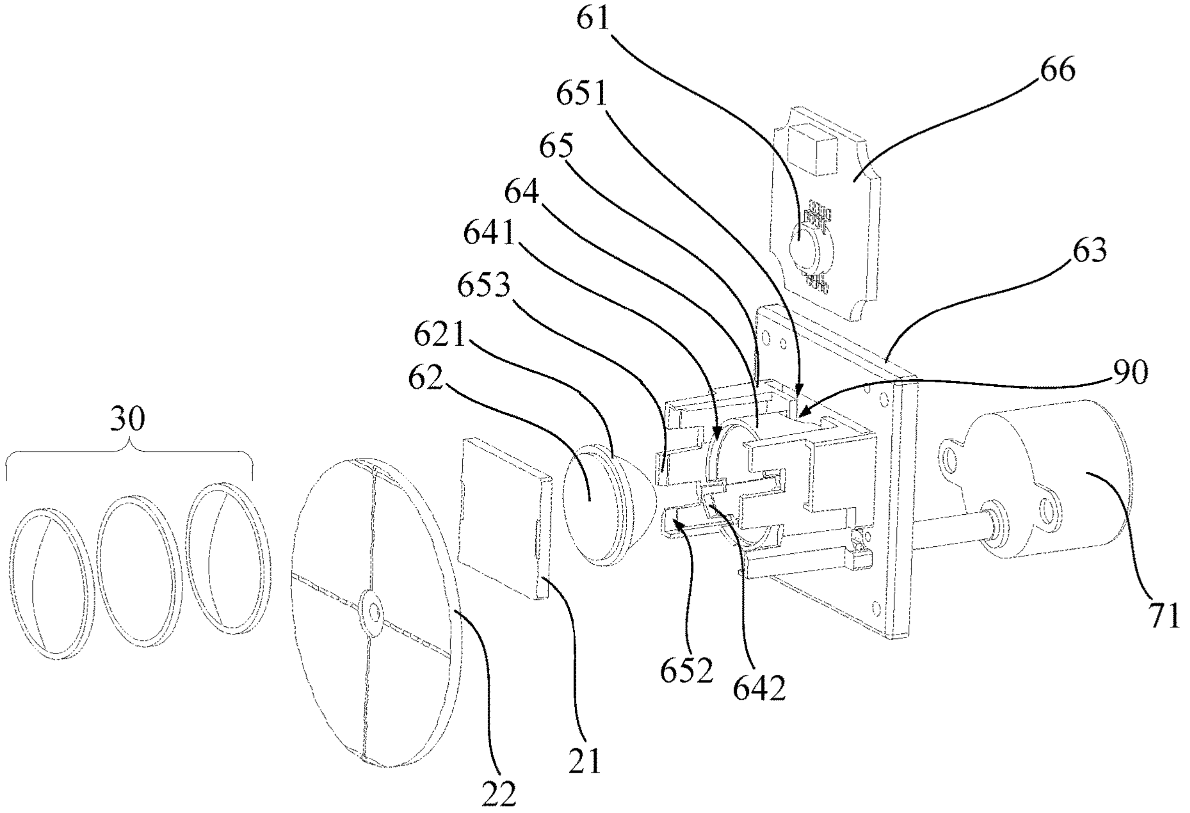
FIG. 3 is a schematic structural diagram of a light-emitting assembly, an imaging assembly, a lens group, and a driving assembly in an exploded state.

Further, as shown in FIGS. 1 to 3, the light-emitting assembly comprises a first mounting seat 63, the first mounting seat 63 is fixed within the first housing 10, and the incoherent light source 61 and the condenser lens 62 are arranged on the first mounting seat 63. In this embodiment, the first mounting seat 63 is used to provide a mounting position for the incoherent light source 61 and the condenser lens 62, a plurality of fixing bosses 13 for fixing are protrudingly arranged inside the first housing 10, and the first mounting seat 63 is fixed on the fixing bosses 13 through screws, such that the light-emitting assembly is stably arranged in the first housing 10, and the structural stability of the starry sky lamp is effectively improved.

Further, as shown in FIGS. 1 to 3, the first mounting seat 63 is provided with a first fixing seat 64 and a second fixing seat 65, the condenser lens 62 is mounted on the first fixing seat 64, and the first nebula piece 21 is mounted on the second fixing seat 65. In this embodiment, the first fixing seat 64 is used to fix the condenser lens 62, and the second fixing seat 65 is used to fix the first nebula 21. Specifically, the first fixing seat 64 has a shape of a hollow tube, an end of the first fixing seat 64 is fixed on the first mounting seat 63 and covers the incoherent light source 61, and the condenser lens 62 is mounted at the other end of the first fixing seat 64 opposite to the incoherent light source 61 to receive the light emitted by the incoherent light source 61. The second fixing seat 65 is arranged on the peripheral side of the first fixing seat 64 and is fixed on the first mounting seat 63, and the first nebula piece 21 is arranged at an end that is of the second fixing seat 65 and that is far away from the first mounting seat 63. It should be explained that the first nebula piece 21 is arranged on a side that is of the condenser lens 62 and that is far away from the incoherent light source 61 to receive the light passing through the condenser lens 62.

Further, the first fixing seat 64 is provided with a first mounting groove 641 and a first clamping buckle 642, a limiting ring 621 is convexly arranged on the peripheral side of the condenser lens 62, and the limiting ring 621 is arranged in the first mounting groove 641 and is abutted against and fixed to the first clamping buckle 642; the second fixing seat 65 is provided with a second mounting groove 652 and a second clamping buckle 653, and the first nebula piece 21 is arranged in the second mounting groove 652 and is abutted against and fixed to the second clamping buckle 653.

Further, the first fixing seat 64 is arranged on the second fixing seat 65, a bottom of the second fixing seat 65 is provided with a slot 651, the light-emitting assembly further comprises a circuit board 66, the incoherent light source 61 is fixed on the circuit board 66, and the circuit board 66 is inserted into the slot 651. In addition, the first fixing seat 64 and the second fixing seat 65 are both provided with a clearance groove 90 for avoiding the incoherent light source 61, such that the circuit board 66 can be conveniently mounted.

Further, as shown in FIGS. 1 to 3, the driving assembly comprises a driving motor 71, the driving motor 71 is fixed on the first mounting seat 63, and the second nebula piece 22 is fixed on a motor shaft of the driving motor 71. In this embodiment, the driving assembly can be directly driven by a motor, can also be driven by a motor via a belt, and can still be driven by a motor via a gear set. Compared with the belt transmission and the gear transmission, the structure used when the driving motor 71 directly drives the second nebula piece 22 to rotate is simpler. Specifically, the driving motor 71 is fixed on the first mounting seat 63, and the motor shaft of the driving motor 71 passes through the first mounting seat 63 to be fixed to the second nebula piece 22, such that the second nebula piece 22 is driven to rotate, making the lighting effects of the starry sky lamp dynamic.

It should be explained that the starry sky lamp further comprises a control board, and the control board is electrically connected to the driving motor 71 to control the rotation speed of the driving motor 71, and further, to control the changing speed of the lighting effects of the starry sky lamp.

Further, as shown in FIGS. 1 to 3, the lens group 30 further comprises a fixing sleeve 32, and the plurality of imaging lenses 31 are arranged at intervals within the fixing sleeve 32. In this embodiment, the fixing sleeve 32 is used to fix the imaging lenses 31, such that the plurality of imaging lenses 31 are always located on the same axis, so as to prevent the relative positions of the plurality of imaging lenses 31 from changing when the starry sky lamp is subjected to an external force, which further affects the projection effect of the starry sky lamp, and therefore, the structural stability of the starry sky lamp is effectively improved.

Further, the lens group 30 further comprises a second mounting seat 33, and the second mounting seat 33 is fixed on an inner wall of the first housing 10 at a position corresponding to the light-emitting opening 11. The second mounting seat 33 comprises a third fixing seat 34 arranged in a hollow manner, the fixing sleeve 32 is mounted at an end of the third fixing seat 34, and the other end of the third fixing seat 34 is arranged towards the light-emitting opening 11.

Further, as shown in FIG. 1 and FIGS. 4 to 8, the starry sky lamp further comprises a laser assembly 100. The laser assembly 100 is another light-emitting device of the starry sky lamp, and may be specifically arranged in the first housing 10 or may be arranged on the peripheral side of the first housing 10, which is not limited herein. The laser assembly 100 comprises a coherent light source 101 and a diffractive medium 102. The diffractive medium 102 is arranged on an irradiation surface of the coherent light source 101, and the diffractive medium 102 is used to diffract the light emitted by the coherent light source 101 to form a diffractive light beam. This is used to present another lighting effect of the starry sky lamp.

Figure 4:
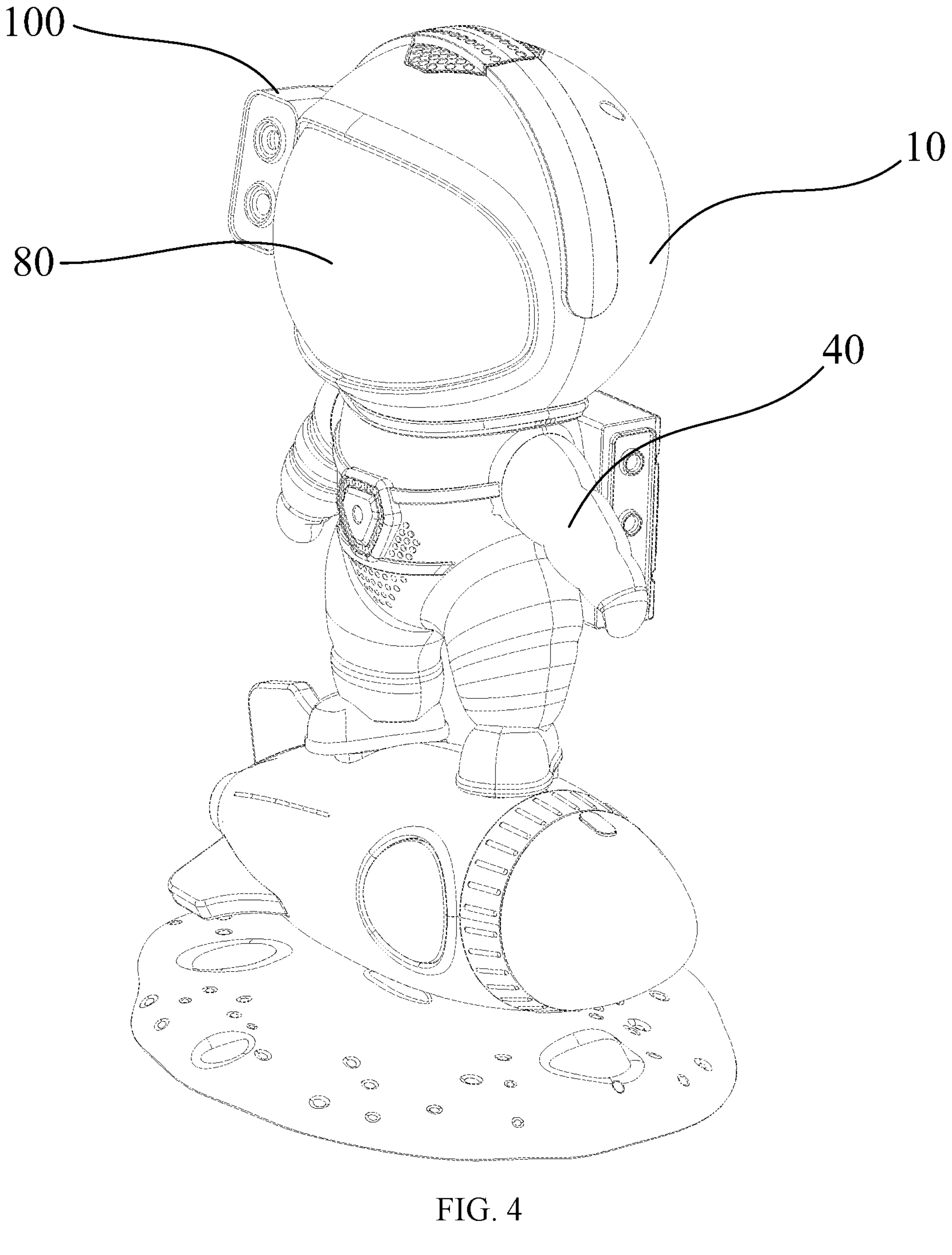
FIG. 4 is a schematic structural diagram of an embodiment of a starry sky lamp according to the present utility model.
Figure 5:
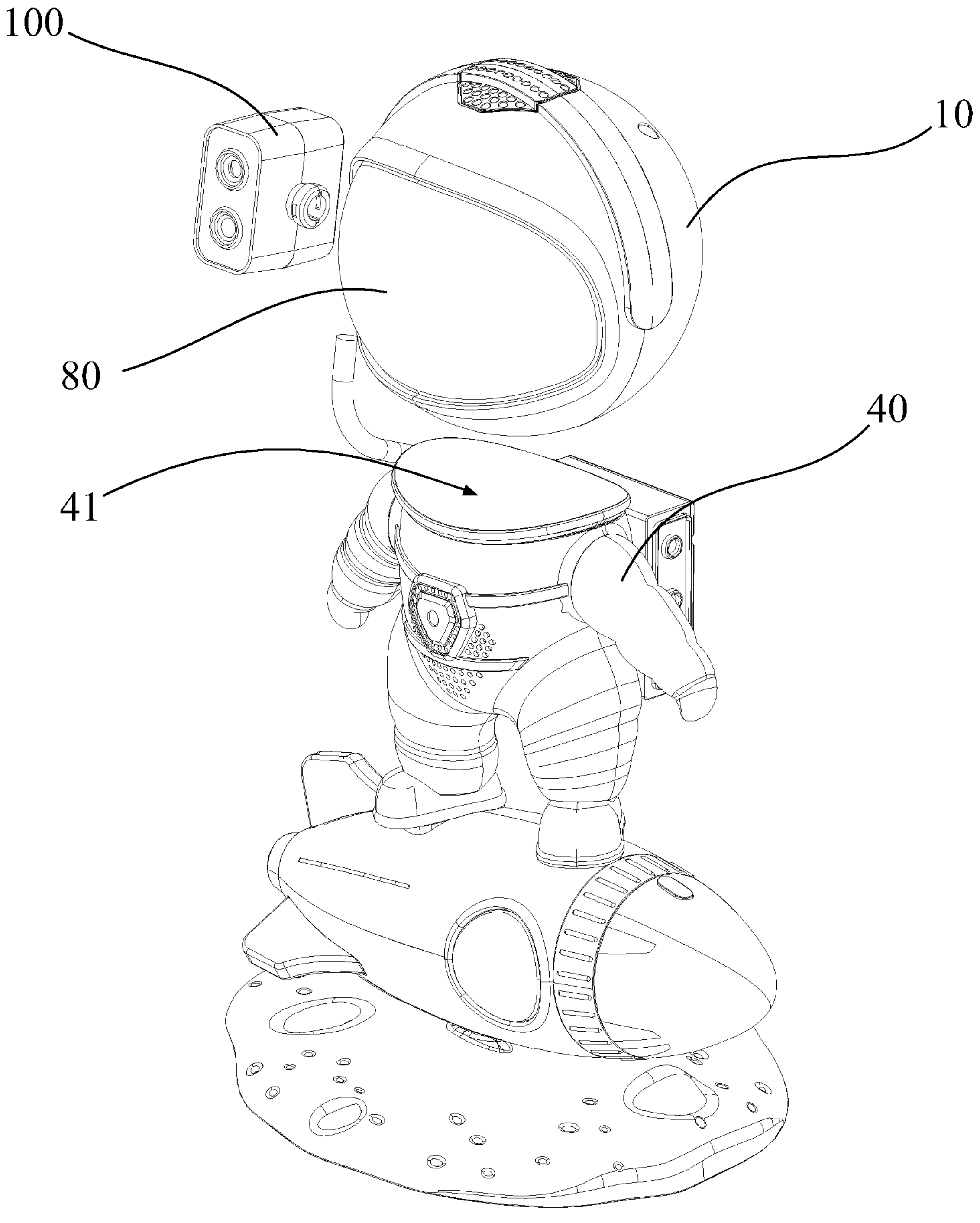
FIG. 5 is a schematic structural diagram of an embodiment of a starry sky lamp in an exploded state from an angle according to the present utility model.
Figure 6:
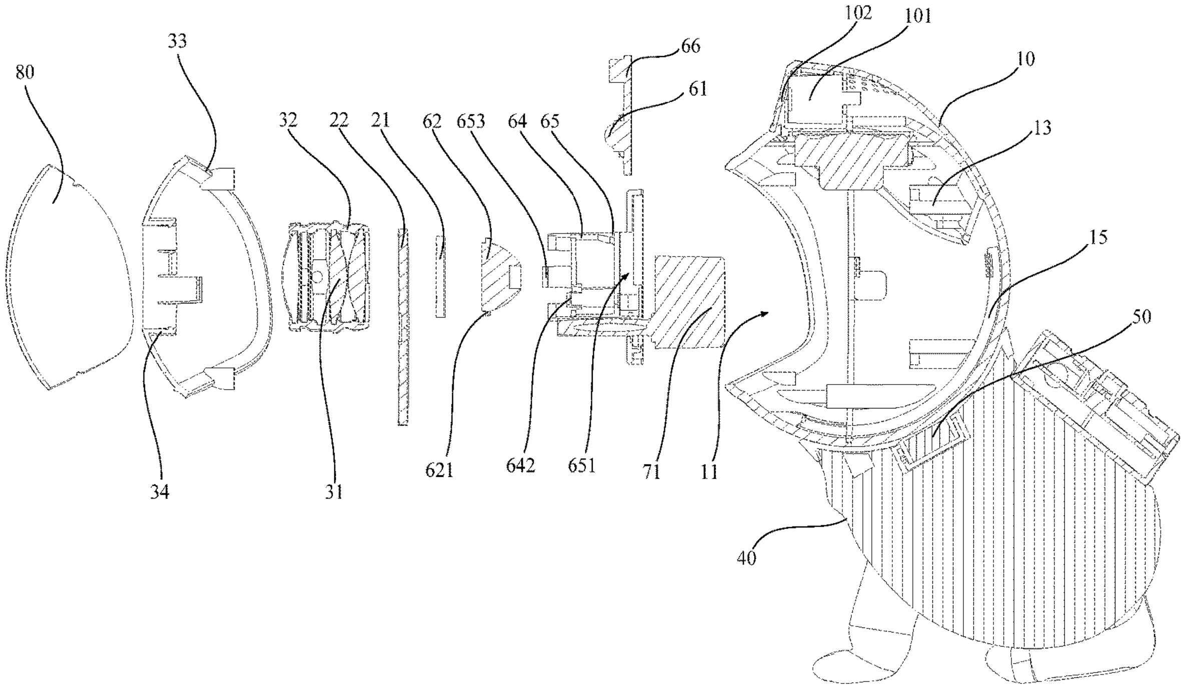
FIG. 6 is a schematic structural diagram of another embodiment of a starry sky lamp in an exploded state from an angle according to the present utility model.
Figure 7:
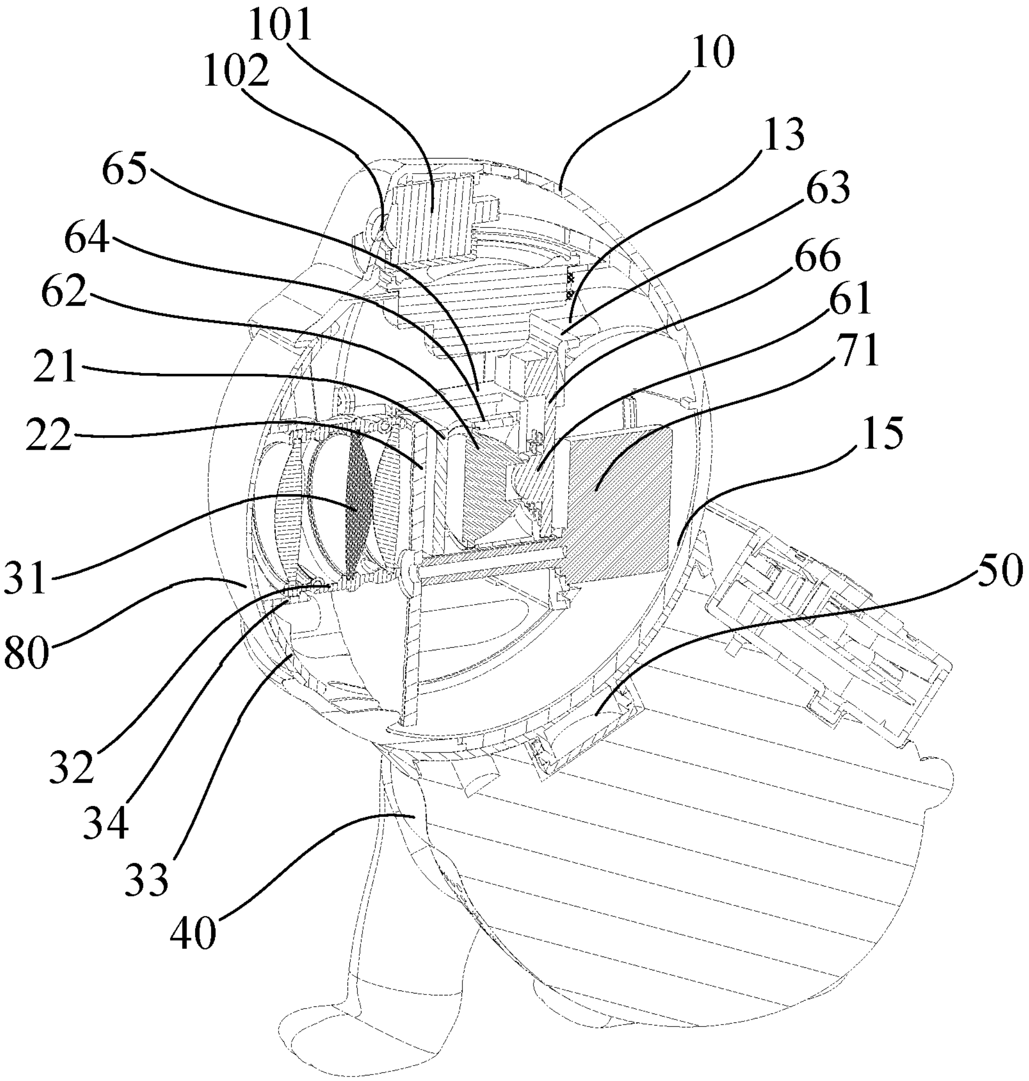
FIG. 7 is a cross-sectional view of another embodiment of a starry sky lamp from another angle according to the present utility model.
Figure 8:
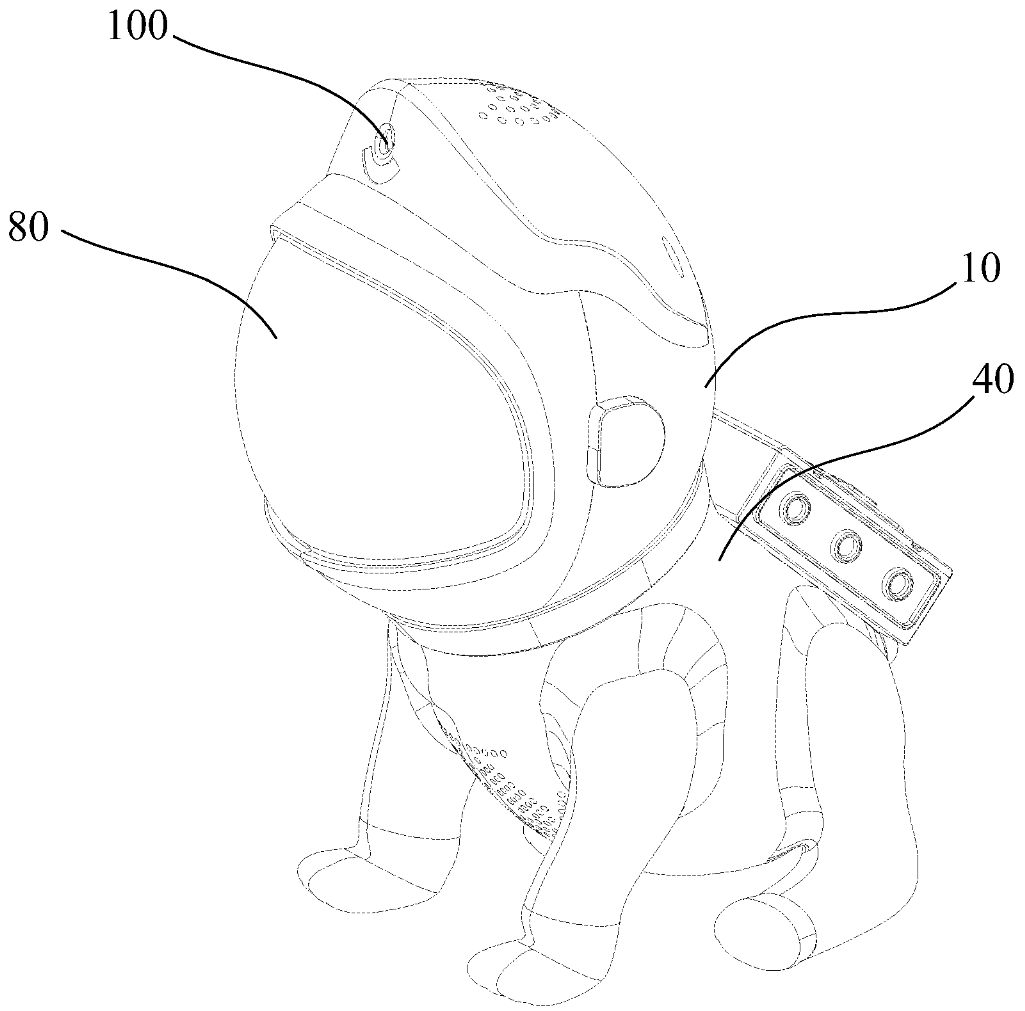
FIG. 8 is a schematic structural diagram of another embodiment of a starry sky lamp according to the present utility model.
Figure 9:
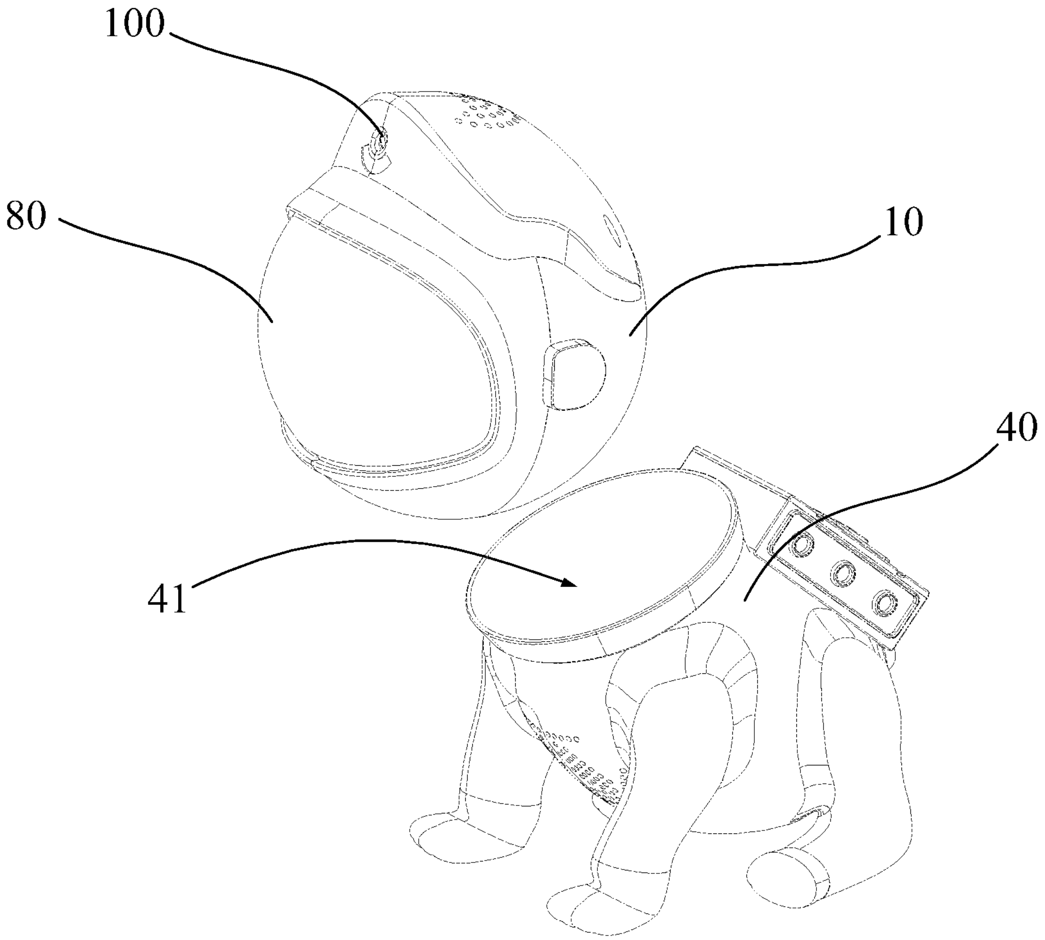
FIG. 9 is a schematic structural diagram of another embodiment of a starry sky lamp in an exploded state from another angle according to the present utility model.

Further, as shown in FIGS. 1, 4 and 5, the starry sky lamp further comprises a light-transmitting protective cover 80. The light-transmitting protective cover 80 is arranged in the first housing 10 and is arranged corresponding to the light-emitting opening 11, and the light-transmitting protective cover 80 is used to close the light-emitting opening 11, so as to prevent electrical elements in the first housing 10 from being damaged by an external force, such that the safety of the starry sky lamp is effectively improved.

Further, as shown in FIGS. 1, 4 and 5, the first housing 10 has an arc-shaped connecting portion, and the second housing 40 is provided with a movable groove 41 adapted to the shape of the connecting portion; and the connecting portion is provided with a strip-shaped iron sheet 15, and a bottom of the movable groove 41 is provided with a magnet 50 cooperating with the strip-shaped iron sheet. In this embodiment, the first housing 10 and the second housing 40 are connected by magnetic attraction. Specifically, the connecting portion of the first housing 10 is provided with a strip-shaped iron sheet 15, and at least one magnet 50 is arranged in the movable groove 41 of the second housing 40, and when the connecting portion of the first housing 10 is close to the movable groove 41 of the second housing 40, the first housing 10 is closely attached to the second housing 40 by magnetic attraction. Meanwhile, the connecting portion of the first housing 10 is arc-shaped, and the shape of the movable groove 41 is adapted to that of the connecting portion, such that the first housing 10 can be rotated relative to the second housing 40, and the practicability of the starry sky lamp is effectively improved.

Further, the corresponding iron sheet can be arranged in the movable groove 41 and the magnet 50 can be arranged in the connecting portion to achieve magnetic attraction of the iron sheet and the magnet, which is not specifically limited herein.

Further, in other embodiments, relative rotation between the first housing 10 and the second housing 40 can also be realized through a clamping engagement or through a rotating shaft, etc., all of which can realize the relative rotational connection between the first housing 10 and the second housing 40, which is not specifically limited herein.

Still further, as shown in FIGS. 6, 7, 8 and 9, the starry sky lamp has a shape of a dog in a sitting posture, which is of interestingness. The first housing 10 has a shape of a dog head, and the second housing 40 has a shape of a dog body in a sitting posture.

The above mentioned contents are only optional embodiments of the present utility model and are not intended to limit the patent scope of the present utility model, and under the inventive concept of the present utility model, the equivalent structural transformations made by using the contents of the specification and the drawings of the present utility model, or direct/indirect applications to other related technical fields, are all included in the patent protection scope of the present utility model.

What is claimed is:

1. A starry sky lamp, comprising:

a first housing, wherein the first housing is provided with a light-emitting opening;

a light-emitting assembly, wherein the light-emitting assembly is arranged in the first housing and emits light towards the light-emitting opening, and the light-emitting assembly comprises at least one incoherent light source, a condenser lens arranged in an irradiation surface of the at least one incoherent light source and a first mounting seat fixed within the first housing, wherein the at least one incoherent light source and the condenser lens are arranged on the first mounting seat;

an imaging assembly, wherein the imaging assembly is arranged in the first housing and between the condenser lens and the light-emitting opening, and the imaging assembly comprises a first piece and a second piece sequentially arranged along an irradiation direction of the light-emitting assembly;

a lens group, wherein the lens group is arranged in the first housing and between the second piece and the light-emitting opening, and the lens group comprises a plurality of imaging lenses sequentially arranged along the irradiation direction of the light-emitting assembly;

a driving assembly, wherein the driving assembly is arranged in the first housing, and the driving assembly is in driving connection with the second piece to drive the second piece to rotate; and a second housing, wherein the second housing is detachably connected to the first housing;

wherein the first mounting seat is provided with a first fixing seat and a second fixing seat, the condenser lens is mounted on the first fixing seat, and the first piece is mounted on the second fixing seat.

2. The starry sky lamp according to claim 1, wherein the first fixing seat is arranged on the second fixing seat, a bottom of the second fixing seat is provided with a slot, the light-emitting assembly further comprises a circuit board, the at least one incoherent light source is fixed on the circuit board, and the circuit board is inserted into the slot.

3. The starry sky lamp according to claim 1, wherein the first fixing seat is provided with a first mounting groove and a first clamping buckle, and the condenser lens is arranged in the first mounting groove and is fixed through the first clamping buckle; and the second fixing seat is provided with a second mounting groove and a second clamping buckle, and the first piece is arranged in the second mounting groove and is fixed through the second clamping buckle.

4. The starry sky lamp according to claim 1, wherein the driving assembly comprises a driving motor, the driving motor is fixed on the first mounting seat, and the second piece is fixed on a motor shaft of the driving motor.

5. The starry sky lamp according to claim 1, wherein the lens group further comprises a fixing sleeve, and the plurality of imaging lenses are arranged at intervals within the fixing sleeve.

6. The starry sky lamp according to claim 5, wherein the lens group further comprises a second mounting seat, the second mounting seat is arranged corresponding to the light-emitting opening, the second mounting seat is provided with a third fixing seat, and the fixing sleeve is mounted on the third fixing seat.

7. The starry sky lamp according to claim 1, further comprising a laser assembly arranged on the first housing, wherein the laser assembly comprises a coherent light source and a diffractive medium arranged on an irradiation surface of the coherent light source.

8. The starry sky lamp according to claim 1, wherein the first housing has an arc-shaped connecting portion, and the second housing is provided with a movable groove adapted to the shape of the connecting portion; and the connecting portion is provided with a strip-shaped iron sheet, and a bottom of the movable groove is provided with a magnet cooperating with the strip-shaped iron sheet.

* * * * *